United States Patent [19]
Erlbacher

[11] Patent Number: 5,448,146
[45] Date of Patent: Sep. 5, 1995

[54] METHOD FOR APPLYING CONSTANT FORCE WITH NONLINEAR FEEDBACK CONTROL AND CONSTANT FORCE DEVICE USING SAME

[75] Inventor: Edwin A. Erlbacher, Dallas, Tex.

[73] Assignee: Board of Regents, The University of Texas System, Austin, Tex.

[21] Appl. No.: 11,658

[22] Filed: Jan. 29, 1993

[51] Int. Cl.⁶ .................. G06F 15/46; G08B 23/00
[52] U.S. Cl. ..................... 318/568.17; 318/571; 318/572; 364/508
[58] Field of Search ................ 318/560–646; 364/474.01–474.32, 508, 551, 424.05, 550, 147, 148; 73/609, 660; 340/680

[56] References Cited

U.S. PATENT DOCUMENTS

| | | | |
|---|---|---|---|
| 3,735,157 | 5/1973 | Whetham | 318/571 |
| 3,759,139 | 9/1973 | Whetham | 318/571 |
| 3,777,125 | 12/1973 | Whetham | 318/571 |
| 4,049,077 | 9/1977 | Mifsud | 181/114 |
| 4,510,683 | 4/1985 | Fedde et al. | |
| 4,545,153 | 10/1985 | Miller et al. | |
| 4,559,600 | 12/1985 | Rao | 364/474 |
| 4,569,627 | 2/1986 | Simunovic | |
| 4,603,511 | 8/1986 | Komatsu et al. | |
| 4,704,693 | 11/1987 | Thomas | 364/508 |
| 4,724,524 | 2/1988 | Thomas et al. | 364/474 |
| 4,782,452 | 11/1988 | Thomas | 364/550 |
| 4,806,914 | 2/1989 | Thomas et al. | 340/680 |
| 4,826,392 | 5/1989 | Hayati | |
| 4,953,089 | 8/1990 | Wolfe | 364/424.05 |
| 5,052,736 | 10/1991 | Loncaric et al. | |
| 5,126,645 | 6/1992 | Yoshimi et al. | |
| 5,129,044 | 7/1992 | Kashiwagi et al. | |

FOREIGN PATENT DOCUMENTS

221953A1 5/1985 Germany.
3627560A1 2/1988 Germany.

OTHER PUBLICATIONS

Mecanotron Corporation, 2733 Patton Road, Roseville, Minn. 55113, New Product Literature.
Automation & Robotics Research Institute, Fort Worth, Tex., Automatic Surface Finishing Workshop and Seminar, Jan. 30, 1992–Jan 31, 1992.
E. A. Erlbacher II, Robotic Surface Finishing Cell for Contoured Scalloped Parts, Disseration to The University of Texas at Arlington, May 1992.
T. J. Lawley and E. A. Erlbacher, Robotic Grinding of Parts to Remove Machine Tool Scallops and Mismatch, SME Technical Paper, Conference in Dayton, Ohio Jun. 9, 1992–Jun. 11, 1992.
R. Littel, Force/Torque Sensing in Robotic Manufacturing, Sensors, 9(11):6–13 (1992).
*Robotic Deburring Methods Using Force Control* in Automated Deburring, Conference Proceedings, vol. 2, Detroit, Mich. *Robots 12 and Vision '88*, Jun. 5–9, 1988, pp. 16–26 to 16–29.
*Robotic Deburring Methods* in Society of Manufacturing Engineers Conference at Chicago Marriott Schaumburg, Schaumburg (Chicago), Ill., Oct. 11–12, 1988.

*Primary Examiner*—Paul Ip
*Attorney, Agent, or Firm*—Arnold, White & Durkee

[57] ABSTRACT

An actively controlled, pneumatically-actuated constant force device (CFD) which may be fixed to a stationary mount or moved in three-dimensional space proximate a work surface. The device applies substantially constant force from an actuator, through a linkage, to a tool in contact with a work surface, e.g., a drilling, grinding or finishing tool, or a laminating roller. A processor provides closed-loop control of estimated tool force applied to the work surface, regardless of tool orientation. CFD compliance and response time may be altered by adjustment of gas pressures in a pneumatic cylinder. Active control of estimated tool force includes processing of information on actuator force, actuator orientation, tool and linkage weight, and actuator motion, as well as work surface irregularities. The device automatically compensates for changes in desired (reference) tool force by adjusting gas pressures entering a pneumatic force generator to bring estimated applied tool force into substantial agreement with the reference tool force.

56 Claims, 3 Drawing Sheets

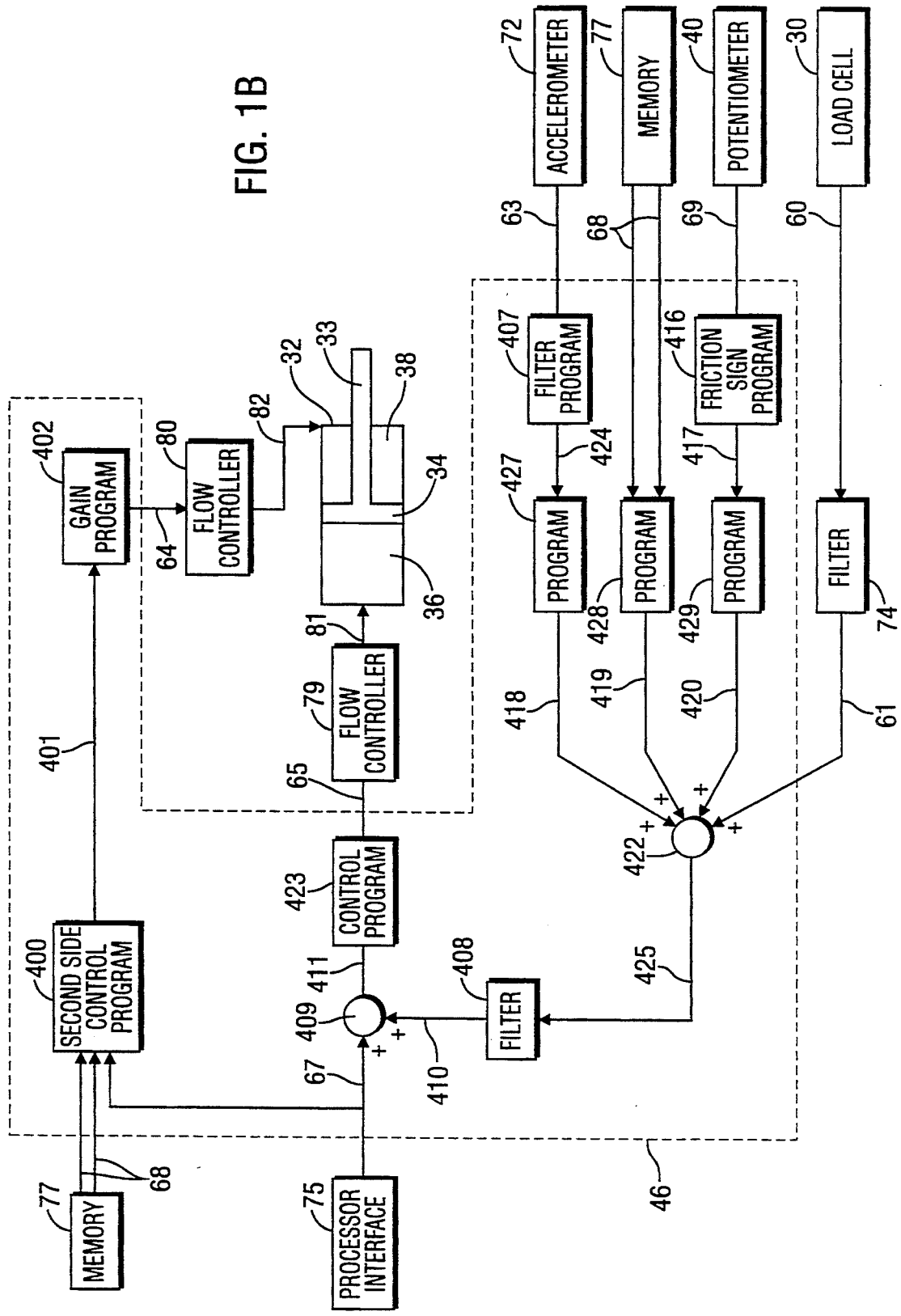

METHOD FOR APPLYING CONSTANT FORCE WITH NONLINEAR FEEDBACK CONTROL AND CONSTANT FORCE DEVICE USING SAME

BACKGROUND OF THE INVENTION

Field of the Invention

The present invention includes methods and apparatus related to constant force devices in stationary and robotically positioned applications.

Actuators for Surface Finishing

Complex contoured parts produced by common machining methods, such as milling with a ball-nosed end mill cutting tool, commonly require surface finishing treatments to smooth the surface pattern remaining after machining. These treatments have traditionally included, for example, grinding the surface manually with hand-held grinders. Hand grinding and analogous manual finishing operations, however, are relatively labor-intensive and produce parts which may differ materially from one another. The differences are due in part to variations in manual force applied to the finishing tool, and errors resulting from operator misjudgment may require addition of material to the part surface. In contrast, accurate and automatic provision of constant force to surface finishing tools enhances predictability of material removal rates, improves the quality and uniformity of finished products, and decreases total processing time.

Industrial robots have been employed in a variety of systems to achieve greater uniformity in execution of surface finishing tasks. One approach has been to apply the desired forces using "through the arm" control. This method adjusts the torque on each joint of the robot's arm by reading, e.g., a force sensor mounted on or in series with the finishing tool. Because torque adjustment errors may be cumulative and response time to correct errors is excessive, this method commonly results in instances of excessive force applied to the surface; thus, it is generally too inaccurate for commercial applications.

An alternative to "through the arm" control has been the use of constant force devices (CFD's) in "around the arm" control systems. In such systems, the robot arm is used to position and translate the CFD proximate the surface, and the CFD then applies the desired (reference) tool force directly to a tool which is itself applied to the surface. This "around the arm" process effectively decouples the surface force control from the robot controller and allows less complicated, more accurate and more precise surface force control. Either active or passive control may be employed in the design of "around the arm" systems incorporating a CFD, active systems using feedback to alter tool force and passive systems operating without feedback (i.e., open-loop).

Mechanically Counter-Balance Passive CFD

A passive pneumatically-operated CFD may be placed on a stationary mount and incorporate a gas regulator to provide its pneumatic actuator with a substantially constant reference pressure. The reference pressure is then related to actual tool force at the surface by the pneumatic actuator transfer function and by friction or inertial effects present in the mechanical linkage from actuator to tool, including friction in the actuator itself.

The passive CFD may also be disconnected from its stationary mount to allow changes in orientation which would cause the weight of the actuator-to-tool linkage to increase or reduce actual tool force at the work surface. To maintain a substantially constant tool force, the CFD may employ a mechanical counter-weight to offset the weight vector of those portions of the CFD having an orientation-sensitive influence on tool force, e.g., a slidably mounted motor/tool assembly.

Use of a mechanical counter-weight has the advantage of simplicity, but it also has several disadvantages. Like the gas regulator which serves the pneumatic actuator, it is part of an open-loop system wherein the actual tool force applied depends on parameters which may be substantially affected by component wear and friction forces. Further, the increase in CFD mass due to the counter-weight tends to lengthen CFD response times and cause increased oscillation when the device is subjected to surface irregularities or changes in regulator pressures. The added mass of the counter-weight also mandates use of a larger robot than would be required without the counter-weight, while reconfiguration (e.g., for different motors or finishing tools) is complicated because the counter-weight must be physically modified if the weight of the motor, motor carriage or tool is changed. Finally, frictional forces in the linkage from actuator to tool cannot be compensated in a passive CFD; so special ultra-low friction components must be used with consequent cost penalties and application limitations.

Pneumatically counter-Balanced CFD

In contrast to CFD's with mechanical counter-weights, pneumatically counter-balanced CFD's generally use electronics to control gas flows and pressures which compensate for changes in the orientation-sensitive influence of the motor weight vector. Orientation information may be provided by instruments on the CFD or by the robot controller. The resulting electronic/pneumatic control systems allow more design options and provide for a lighter, more compact and more responsive CFD design through elimination of the counter-weight.

Eliminating a counter-weight will improve the responsiveness of both passive and actively (feedback) controlled CFD's. In the latter devices, closed-loop control can be achieved through feedback comprising an estimate of tool force based on related measurements, e.g., actuator force or gas pressures. Estimated force feedback may then be combined with reference (desired) tool force input, weight vector compensation, and estimated or measured friction forces to generate an error signal to be applied to a controller. Benefits would include shortened response times to commands, quicker dissipation of system disturbances due to tool or CFD motion, and better maintenance of substantially constant tool forces. Currently available CFD's, however, do not provide for active control of estimated tool force output.

SUMMARY OF THE INVENTION

CFD Components, Organization and Function

The present invention relates to CFD's having an actuator to apply substantially constant force (tool force) substantially equal to a reference (desired) tool force through a tool to a work piece surface, as for drilling, sanding, grinding or polishing the surface, or applying pressure-sensitive coatings or objects to the surface (e.g., as with a laminating roller). Preferred embodiments of the CFD's have double-acting pneumatic actuators, i.e., having a first gas chamber and a second (opposite acting) gas chamber. Alternative double-acting actuators (e.g., electromagnetic, hydraulic and electromechanical) may be used, having first side and second side inputs analogous to first and second side gas pressures in double-acting pneumatic actuators. The choice of actuator depends on application constraints (e.g., required response time, compliance, maximum weight). Actuators act directly on the tool through a mechanical linkage (e.g., a tool/tool-holder on the actuator or a slide-mounted motor/tool assembly), which in general has friction effects and, in some embodiments, inertial effects which may affect estimated actual tool force applied.

In preferred embodiments, the actuator first side or chamber is within a closed (active) first side control loop with output a function of a tool force acceleration component and a tool force friction component, the latter calculated from estimates of friction in the linkage connecting the actuator to the tool. The actuator second side or chamber is within a second side control loop with output a linear or nonlinear function of the reference tool force and the tool force acceleration component, the latter being estimated by calculation based on inclinometer or accelerometer output (including single axis or three axis accelerometers coupled to the actuator). Accelerometer output is related to acceleration effects on estimated tool force due to accelerations of the CFD (including acceleration due to gravity). The second side control loop is open in some preferred embodiments, but it may be employed to actively control tool force in other preferred embodiments.

Each actuator has a movement axis (analogous to the longitudinal axis of the piston rod of a pneumatic cylinder, or the axis of motion of a hydraulic, electromagnetic or electromechanical actuator) and is coupled to accelerometer means and to a tool holder (which may hold interchangeable tools) so as to be able to exert force on the tool in a direction substantially parallel to the movement axis. A CFD control system incorporates calculated amounts of counter-balance force to compensate for CFD acceleration effects on tool force (tool force acceleration effects or components) due to the motor/tool weight vector; such components are estimated using measurements by the accelerometer means coupled to the actuator. An active (feedback) control processor for estimated tool force uses calculated tool force estimates based on actuator force measurements by one or more load cells or analogous force sensors (load cell means) having load cell means outputs and coupled to the actuator. The processor also may use calculated weight vector compensation (comprising gravitation effects on tool force due to weight vector components which act substantially parallel to the movement axis) and calculated estimates of friction effects and linkage inertial effects on actual tool force. Load cell means outputs are subject to filtering through a low-pass filter coupled to the load cell means and the processor. Specification of the low-pass filter characteristics is a function of each CFD application, including actuator stiffness and response time. In preferred embodiments, the low-pass filter characteristic has a half-power point between 1 and 100 Hertz (Hz), most preferably about 10 Hz.

In preferred embodiments having pneumatic actuators, feedback (comprising calculated estimates of tool force) is based in part on measurements of actuator force and/or gas pressures from both the first and second sides (corresponding to first and second gas chambers) of one or more pneumatic actuators, plus calculated acceleration-sensitive effects of the weight vector. In preferred embodiments having alternative (nonpneumatic) actuators, feedback (comprising calculated estimates of tool force) is based in part on measurements of actuator force and/or actuator inputs from both the first and second sides of one or more actuators (e.g., hydraulic pressure or electrical voltage), plus calculated acceleration-sensitive effects of the weight vector.

In some preferred embodiments, estimated tool force may be low-pass filtered before being compared with a desired (reference) tool force to produce an error signal in the first side control loop. Alternatively, the components of estimated tool force themselves, e.g., the tool force acceleration component and the tool force friction component, may be of sufficiently low bandwidth or may be low-pass filtered so as to obviate the need for low-pass filtering of estimated tool force. The error signal is input to a nonlinear processor within the first side control loop comprising a proportional-integral-differential (PID) controller, a proportional-differential (PD) controller, or a proportional-integral (PI) controller. A separate (second side) control loop program within the processor determines the pressure to be maintained in the second gas chamber of the actuator (second control loop program) to compensate for the changing weight (acceleration-dependent) vector when the CFD moves in three-dimensional space. The equation describing the behavior of the second side control loop program (implementing the second side equation) is preferably a function of the reference tool force and the tool force acceleration component. The second side equation is preferably linear, and in the case of a pneumatic CFD on a stationary mount or otherwise exposed to no acceleration except that due to gravity, it takes the form:

$$SP_2 = [(C_1)(A_1) - RTF + W \cos \theta]/A_2$$

where
  $SP_2$ is the output pressure signal of the second side control loop program
  $C_1$ may be a constant or a linear or nonlinear function of: reference tool force; the weight of parts of the actuator, linkage, and tool-holder/tool which move in response to actuator inputs; and the orientation angle $\theta$. Its value is directly related to the stiffness of the CFD and inversely related to CFD compliance, where compliance has units of (displacement/force)
  $A_1$ is the area of the piston viewed from the first side of the actuator
  RTF is the reference tool force (a desired tool force defined by the user and input to the CFD processor)
  W is the weight of the linkage connecting the actuator to the tool, including the piston and piston rod, the tool holder, and the tool. When tools wear or are changed, weight will generally change. Tool weights and algorithms for estimating the effects of wear on tool weights are stored in memory. W may be estimated by positioning the CFD with the movement axis substantially parallel to the gravity vector and measuring the force needed to hold the tool/tool-holder in a neutral position with no external load on the tool.

$\theta$ is the fixed angle between the movement axis and the gravity vector, the cosine of which provides a measure of the component of the acceleration due to gravity which acts substantially parallel to the movement axis of the CFD to affect estimated tool force.

$A_2$ is the area of the piston viewed from the second side of the actuator.

This expression may be altered to contain additional acceleration terms if the CFD is exposed to acceleration vectors other than or in addition to gravity.

In embodiments with pneumatic actuators, the processor is coupled to gas pressure regulators and/or gas servo valves (gas flow control means) which are themselves coupled to the actuator (the first and second gas chambers thereof). In embodiments having alternative actuators (e.g., hydraulic, electromagnetic or electromechanical), the processor is coupled to actuator force control means (e.g., hydraulic pressure regulators or electric voltage regulators) which are themselves coupled to the actuator to provide applied force analogous to that provided by a double-acting pneumatic cylinder.

The choice of control means for an actuator (e.g., a pressure regulator or servo valve) depends the speed of response required (e.g., servo valves are generally faster than gas regulators) and whether any separate control parameters which may be needed are available (e.g., pressure or force measurements for use with the servo valve).

The force output of the actuator is a function of the gas pressures applied to the first and second actuator chambers. Actuator output is thus controlled so as to make estimated tool force substantially equal to the reference tool force and return the error signal substantially to zero. Note that if the variable fed back is actuator gas pressures, conversion of these pressures to estimated actuator force and then to estimated tool force would, in general be required. If actual actuator force (as measured by a load cell) is fed back, only the single conversion to estimated tool force would be required. In general, one or more load cells or analogous devices may be positioned within the force linkage from actuator to tool, and the preferred embodiments of the present invention may include feedback from any load cell having an output related to estimated tool force. Factors such as cost, desired response time of the CFD, design tool force levels and reliability help determine preferred load cell locations. Each load cell location will, in general, be associated with one or more control algorithms relating to estimation of tool force, given the actuator and load cell output in question.

In preferred embodiments having actuators comprising double-acting pneumatic cylinders with two ends, there are two gas ports. The ports are proximate to each end of the cylinder and the two ports are on opposite sides of the piston. A piston rod substantially parallel to the longitudinal axis of the cylinder emerges from one end of the cylinder through a sliding seal. Each gas port is supplied gas from a (preferably) voltage-controlled pressure regulator or servo valve, and each regulator or servo valve acts upon a signal from the CFD processor, preferably electrical in nature, but alternatively pneumatic, hydraulic, optoelectronic or mechanical.

In preferred embodiments having actuators comprising two low-friction single-acting pneumatic cylinders analogous to that in FIG. 2, cylinders 701 and 703 are linked in an assembly capable of exerting force as a double-acting pneumatic cylinder. The assembly has two gas ports 705 and 707. The ports are proximate to the pressurizable end of each of the single-acting cylinders, and pressurized gas admitted to the two ports has opposite force effects on structures coupled to movable portion 709. Each gas port is supplied gas from a (preferably) voltage-controlled pressure regulator or servo valve, and each regulator or servo valve acts upon a signal from the CFD processor, preferably electrical in nature, but alternatively pneumatic, hydraulic, optoelectronic or mechanical. The two gas ports on a pneumatic CFD may be served from two gas regulators, two servo valves, or one regulator and one servo valve.

A pressure regulator is itself a closed-loop control system with its set point pressure determined in preferred embodiments by electrical signals. A servo valve has no inherent feedback, relying instead on a pressure transducer connected to the associated pressure chamber or a load cell positioned to sense actuator output force. In the latter case, dynamic actuator output force is a function of pressure in the two opposing gas chambers as well as the pressure difference between the two chambers and any friction or inertial effects within the actuator.

In a preferred embodiment, an actuator (pneumatic cylinder with piston and piston rod) is coupled to a fixed mount or otherwise positioned (as by a robot) in spaced relationship to a workpiece surface. The actuator is coupled through the piston rod to a motor carriage or tool holder, where motion of the carriage or holder is guided by a linear slide or displacement mechanism substantially parallel to the longitudinal axis of the cylinder. In alternative embodiments, the coupling and positioning of the cylinder and piston rod may be interchanged, and pneumatic force generators other than conventional pneumatic cylinders may be used. A drill, grinding disk or other surface finishing tool is attached to the motor or tool holder and placed in contact with a surface against which force is to be exerted by the tool.

Second Side Gas Pressure Control

Gas pressures on the first and second sides of the pneumatic actuator act in opposition. Thus, conversion of first and second side gas pressures to actuator force, as well as determination of active control circuit response times and CFD stiffness, will depend on the choice of algorithms for controlling the gas pressures. Specifically, the choice of minimum gas pressures primarily affects CFD stiffness, while inclusion of a function of the error signal in the second side algorithm may affect control system stability and alter CFD response times.

CFD Positioning Options and Spacing to Work Surface

The invention includes pneumatically-actuated CFD's for application of substantially constant forces substantially parallel to the CFD movement axis to a surface over which the CFD is preferably positioned by a robotic end-effector. The CFD movement axis is nonparallel to the surface when force is applied. CFD's on stationary mounts are also included in the invention, wherein the work surface to be finished is brought to the CFD by some means, including but not limited to robotics.

Spacing between CFD's of the present invention and workpiece surface is determined by a robot used to position the CFD or the workpiece surface. The robot may receive information from the CFD, e.g., from a linear variable differential transformer, potentiometer, or analogous device (collectively, potentiometer means) for signaling whether the CFD actuator is operating substantially closer to one end of its range of motion than the other end. Signals indicating the actuator is not operating substantially in the center of its range of motion result in movement of either the work surface or the CFD by the robot so as to restore acceptable CFD-work surface spacing.

CFD Tool Force Estimates

Response times of the first side (closed-loop) gas pressure control circuit and of the second side control circuit in the present invention are conveniently represented by estimates of the time required for the controlled pressure to rise from 10% to 90% of a final value in response to a step-function change in each control pressure set point. Note that the second side control circuit may be either closed loop or open loop and will generally have a different response time from the first side control circuit. First side response times in preferred embodiments will generally be less than 100 ms and preferably less than 50 ms. Second side response times in preferred embodiments will generally be less than 500 ms and preferably less than 250 ms.

CFD Acceleration Measurements

In general, estimates of inertial influences (tool force acceleration components) are made by obtaining CFD (i.e., actuator) acceleration measurements along three orthogonal axes by accelerometer means, e.g., a three-axis accelerometer set coupled to the CFD (i.e., the actuator). In embodiments where the linkage between the actuator and the tool/tool-holder is subject to acceleration influences only along the movement axis, accelerometer means may comprise a single accelerometer sensing acceleration components parallel to this axis will suffice. In embodiments having accelerometer means, accelerometer output should generally be low-pass filtered in a manner analogous to the filtering applied to actuator force measurements.

Accelerometer means to estimate CFD acceleration may also comprise calculation of acceleration from robot position parameters available in the robot controller, or other CFD position/orientation data with respect to time (rate-of-change-of-position). Required data may be obtained from the robot controller (position parameters) or may be manually entered into the processor, as in the case of a stationary mounted CFD requiring a single constant weight vector compensation based on the CFD mount orientation (i.e., actuator orientation) with respect to gravity. The component of the weight vector which affects acceleration-sensitive CFD components is calculated by the processor, and compensating adjustments of gas pressures for both the first and second gas chambers are determined.

CFD Inclinometer Measurements

When the only acceleration vector to which the CFD will be exposed is gravity, accelerometer means provide for estimation of the component of the gravity vector which is substantially parallel to the movement axis and necessarily affects a component of estimated actual tool force. Estimation of the component may be based on position calculations or on direct measurement of the output of two orthogonal inclinometers which are each orthogonal to the CFD movement axis and coupled to the actuator. In the special case where CFD rotational movement is about only one horizontal axis, a single inclinometer may be coupled to the actuator so as to indicate rotation about this axis and thus furnish the basis of estimation of the gravity vector component substantially parallel to the movement axis. Regardless of the source of inclinometer measurements, if the inclinometer bandwidth exceeds that of the CFD, inclinometer output should be low-pass filtered in a manner analogous to that applied to actuator force signals.

CFD Processor Low-Pass Filtering

Actuator force and calculated or measured weight vector influences due to acceleration are generally subject to a requirement for low-pass filtering to reduce control circuit noise. Filter characteristics for optimal CFD response times are determined empirically for each CFD application, due to the infinite variety of operating conditions possible with variations in reference tool force, tool weight, tool surface speed, surface roughness, CFD response time and stiffness, and CFD positioning motions of a supporting robot arm. However, nonoptimal filter characteristics may be calculated based on conservative estimates of friction and other pertinent variables.

Nonoptimal filtering would typically result in longer CFD response times than would be obtainable from optimally designed processors. For example, if the CFD is has a mechanical frequency response of 10 Hz, the low-pass filter response would preferably be maximally flat to about 10 Hz, and filter gain should preferably be about unity within the bandwidth of the control loop in which the filter acts. Filters in the present invention are preferably at least second order.

Load Cell and Gas Pressure Chamber Measurements

Preferred embodiments of the present invention may include one or more piezoelectric, variable reluctance or analogous sensors (load cells) having output proportional to directly imposed forces, including the force resulting from the combination of first and second side pressures in a pneumatic actuator. Preferred embodiments of the present invention include load cells for actuator force measurement in preference to actuator pressure transducers because force estimates based on pressure measurements must be separately compensated for friction within the actuator, whereas a load cell coupled in series with an actuator measures a resultant actuator force which includes internal actuator friction effects. The load cell or analogous device (load cell means) may operate on pneumatic, hydraulic, optoelectronic, or mechanical principles. It is preferably located in series with (or otherwise coupled to) the pneumatic actuator to provide direct actuator force measurements, or to otherwise sense the force applied to acceleration-sensitive components in the linkage from actuator to the tool-holder/tool. The measurements are used to calculate estimates of the actual force applied through the tool holder to the surface. Location of the load cell in series with the pneumatic actuator is preferred to eliminate friction effects in subsequent calculations of actuator force, but the load cell may be placed in any location wherein an estimate of actuator force may be made based on load cell output.

Surface Sensing and Path Planning

During surface finishing, the robot moves the finishing tool (preceded in some embodiments by a laser or analogous noncontact sensor) across the work surface to reduce the height of surface irregularities. The tool path in these embodiments may be entirely preprogrammed, or it may depend on surface irregularities detected and quantified by the sensor. Closed-loop control gives CFD's of the present invention the ability to apply a substantially constant force while retaining the capability to adjust the tool force and tool path during the finishing process to account for different types of surface irregularities and characteristics.

CFD Memory and Processor Interfaces

The CFD processor is coupled to (communicates with) a processor interface and a memory for storing different tool weights, processor programs (algorithms), and the reference tool force. Processor control programs comprise programs for calculating the estimated tool force, and control programs to for gas flow or analogous inputs to the first and second sides of the actuator, one or both control programs operating on the error signal (reference tool force minus estimated tool force).

The processor interface is preferably an automatic data link, manual keyboard or teach pendant, but may alternatively be any means of entering any combination of algorithms, weights, the orientation angle $\theta$, and a set-point or reference tool force (RTF) into the memory. The processor interface enables data entry in a form compatible with both the processor design and the other data used for active gas counter-balance (closed-loop) CFD control.

BRIEF DESCRIPTION OF THE DRAWINGS

FIG. 1B schematically illustrates the internal organization of programs within processor 46 of FIG. 1A.

DETAILED DESCRIPTION

Abbreviations

CFD—constant force device
ETF—estimated tool force
PD—proportional-derivative
PI—proportional-integral
PID—proportional-integral-derivative
RTF—reference tool force

Surface Finishing With Robotic CFD Positioning

Surface finishing operations when the CFD is under robotic control represent a class of applications in which the linkage from actuator through tool holder to tool is generally compact and relatively insensitive to inertial effects with no components along the movement axis. These characteristics are reflected in the algorithm for calculation of estimated tool force and the algorithm for calculation of second gas chamber pressures, both of which are programs executed by controller 46 in FIGS. 1A and 1B. Note that tool force itself can not be measured directly and must always be calculated.

Figure 1A:
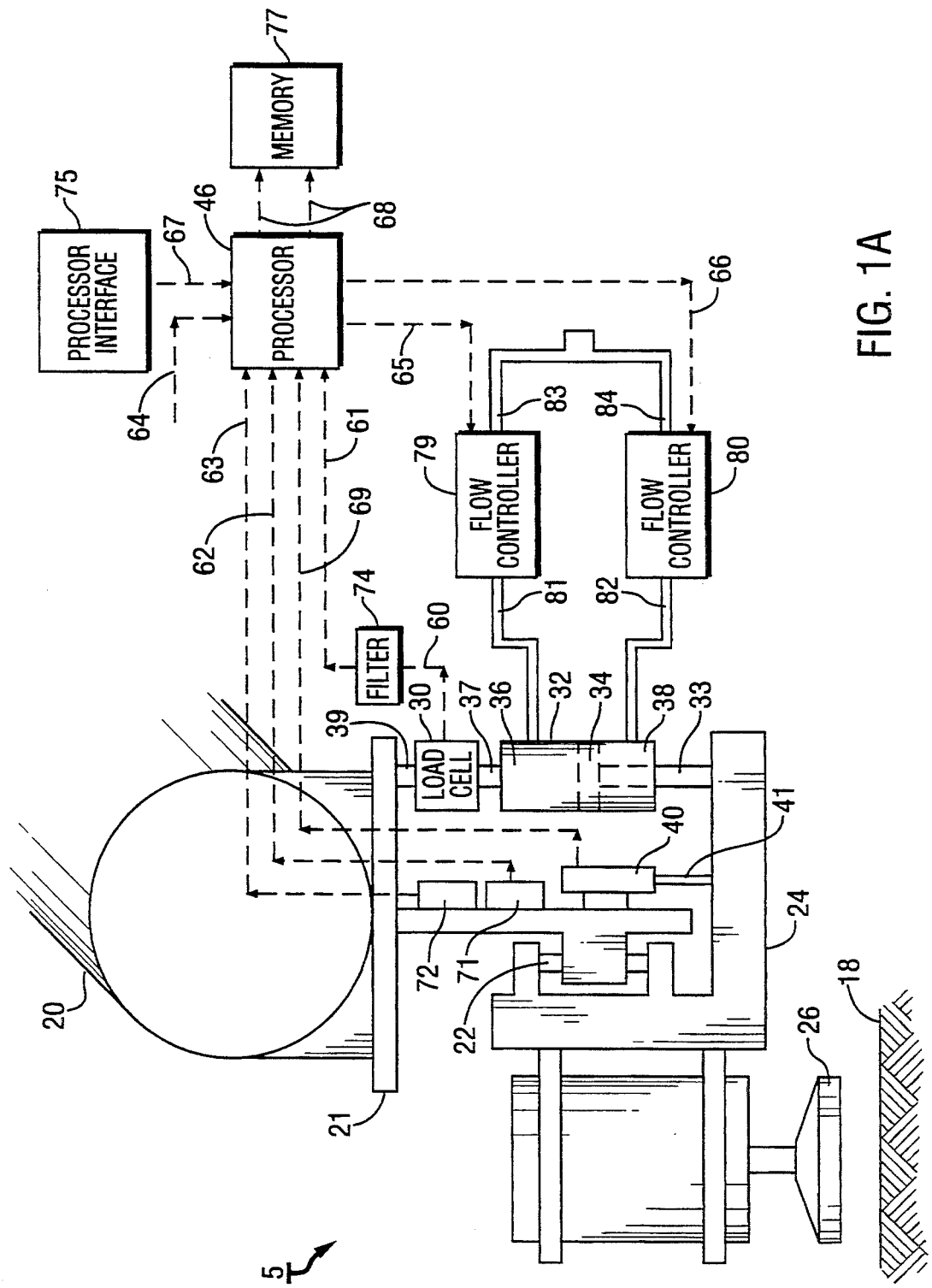
FIG. 1A schematically illustrates a robotically positionable, gas counter-balanced CFD for surface finishing applications.
Figure 2:
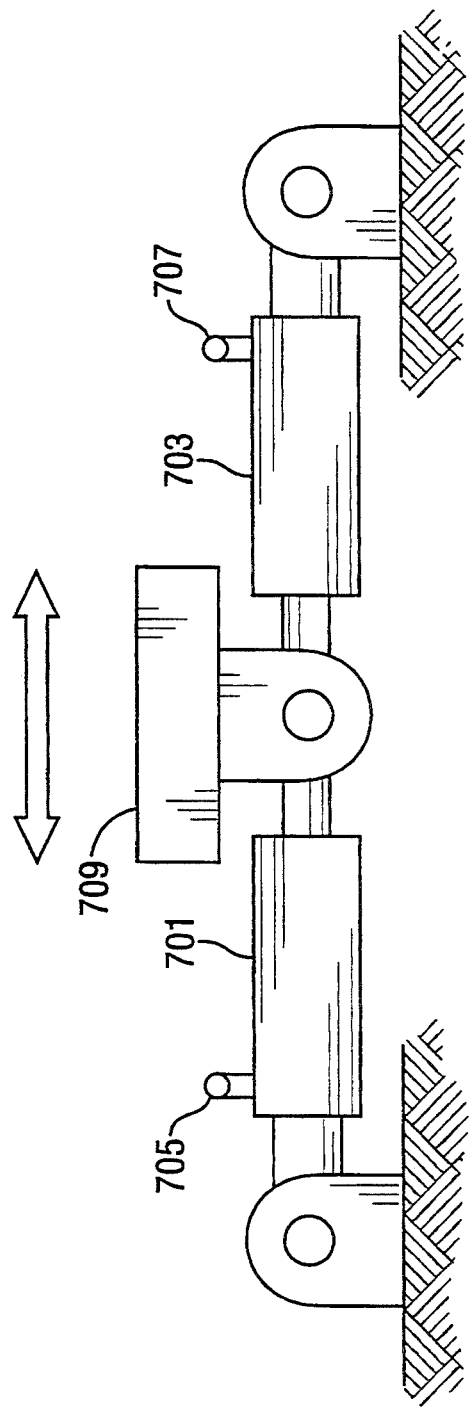
FIG. 2 schematically illustrates a method of connecting two single-acting pneumatic cylinders to function as a double-acting pneumatic cylinder.

To begin surface finishing using a preferred embodiment of the present invention as shown in FIG. 1A, robot arm 20 (controlled through robot position parameters by robot controller, not shown) and end-effector baseplate 21 move CFD 5 toward workpiece surface 18. CFD 5 comprises pneumatic cylinder 32 having piston rod 33, cylinder 32 being series coupled through load cell 30 to end-effector baseplate 21. Piston rod 33 is coupled to motor/tool carriage 24, and carriage 24 is slidably coupled to end effector baseplate 21 through slide 22. The movement axis of pneumatic cylinder 32 is substantially parallel to piston rod 33, which in turn is substantially parallel to slide 22. Hence, when tool 26 touches surface 18 with the movement axis of cylinder 32 nonparallel to the surface, a force component substantially parallel to the movement axis is transmitted through motor/tool carriage 24, piston rod 33 and piston 34 to a gas in first gas chamber 36. Gas pressure in first gas chamber 36, opposed by gas pressure in second gas chamber 38, transmits a force to cylinder 32, which force is transmitted through linkage 37 to load cell 30 and thence through linkage 39 to end effector baseplate 21. Load cell 30 output (representing the load transmitted from cylinder 32 to end effector baseplate 21) is transmitted via data line 60 to low-pass filter 74, and from the filter is transmitted via data line 61 to processor 46.

Processor 46 applies load cell 30 output to an estimated tool force algorithm stored in memory 77. The tool force estimation algorithm, as well as the first and second side control loop programs, are shown schematically in FIG. 1B (described below). The tool force estimation algorithm calculates estimated tool force based on load cell 30 output (as filtered through low-pass filter 74), with compensation for any effect of gravity through calculations based on stored weights of the tool/tool-holder and other components of the actuator-tool linkage which experience a component of acceleration due to gravity parallel to the movement axis of the CFD (the component being determined by the cosine of the CFD orientation angle $\theta$). Measurement of orientation angle 8 may be provided by the robot controller (not shown) or measured by inclinometer 71 and transmitted to processor 46 via data line 62. Also included in the tool force estimation algorithm in some preferred embodiments is compensation for acceleration vector components other than gravity which act on CFD 5 in a direction substantially parallel to the movement axis, being sensed by accelerometer 72 and transmitted to processor 46 via data line 63. In the case where CFD 5 experiences no acceleration component substantially parallel to the movement axis other than gravity alone, the gravity vector component requiring compensation may be measured with inclinometer 71 and transmitted to processor 46 via data line 62. In cases where CFD 5 experiences acceleration substantially parallel to the movement axis due to robotic movement of CFD 5, the resultant vector for all applied accelerations (including gravity) may be measured by a three-axis accelerometer set 72 or by a single-axis accelerometer with maximum sensitivity parallel to the movement axis. Alternatively, an acceleration vector due to movement of CFD 5 alone may be calculated using 3-dimensional robot position parameters from the robot controller (not shown) which enters processor 46 via data line 64, and this acceleration vector may be vectorially added to a calculated gravity vector derived from orientation data present in the robot position parameters from the robot controller.

The mass subjected to the resultant calculated and/or measured acceleration vector comprises all components slidably coupled to end effector baseplate 21. The estimated tool force algorithm also combines previously determined values of friction in slide 22 with compensation for acceleration effects to provide an estimated tool force which is related to but not solely dependent on the force sensed by load cell 30.

Estimated tool force is compared within processor 46 to a reference (desired) tool force entered into processor 46 through processor interface 75 via data line 67 and stored in memory 77 via data line 68. Any difference between estimated tool force and reference tool force is applied to a proportional-integral-differential (PID) controller within processor 46 (see FIG. 1B). The output of the PID controller is applied to gas flow controller 79 via data line 65. Gas flow controller 79 receives pressurized gas in gas line 83 and applies gas pressure to first gas chamber 36 through gas line 81.

A reference tool force is also incorporated in calculation of a desired gas pressure for second chamber 38 by the second side control loop program (see FIG. 1B). The calculated desired gas pressure for second chamber 38 is transmitted to gas flow controller 80 via data line 66. Gas flow controller 80 receives pressurized gas in gas line 84 and applies gas pressure to second gas chamber 38 through gas line 82. Flow controllers 79 and 80 may be gas regulators or servo valves, the latter having generally shorter response times than the former.

Because CFD 5 is supported on a robot arm, it may be moved closer to or farther from workpiece surface 18 by movement of end effector baseplate 21 relative to surface 18. CFD 5 is best able to maintain contact of tool 26 with surface 18 in spite of variations in surface 18 when piston 34 moves substantially in the center of its range of motion within cylinder 32. The position of piston 34 relative to the center of its range of motion is indicated by potentiometer means 40 (a potentiometer, LVDT, or analogous device), which is coupled through sliding element 41 to cylinder 32 through end effector baseplate 21, linkage 39, load cell 30, and linkage 37. Potentiometer means 40 is also coupled (simultaneously) to piston rod 33 and to tool 26 through motor/tool carriage 24. Thus, potentiometer means 40 senses any movement of piston 34 away from the center of its range of motion, providing a signal to the robot controller (not shown) which allows correction of CFD 5 position through alteration of robot position parameters. Potentiometer 40 also provides input to processor 46 via data line 69 to allow determination of the sign of any tool force friction component of estimated actual tool force.

Details of the operation of controller 46 of the preferred embodiment shown in FIG. 1A are described schematically in FIG. 1B. Portions of the embodiment which furnish data to or receive signals from processor 46 are represented in FIG. 1B by labeled boxes lying outside the area enclosed by the closed dashed line.

Processor 46 in FIGS. 1A and 1B comprises the first and second side control loops and the tool force estimation algorithm. Programs providing specified functions within processor 46 are indicated by blocks in FIG. 1B. For example, the second side control loop equation has been described above and is implemented in program 400, using weight and orientation angle data obtained from memory 77 via data line 68, and the reference tool force obtained from processor 75 via data line 67. The output of program 400 is transmitted to program 402 via data line 401. Program 402 comprises a multiplication step providing a desired gain, and the output of program 402 is transmitted via data line 64 to gas regulator 80, controlling the outlet pressure of regulator 80. Gas from the outlet of regulator 80 is carried via gas line 82 to the second side 38 of actuator 32.

The estimated tool force algorithm comprises programs to provide an acceleration component, a tool force friction component, and an actuator force component. Acceleration measured by accelerometer 72 and carried (in embodiments wherein the bandwidth of accelerometer 72 measurements substantially exceeds the bandwidth of filter 74) via data line 63 to program 407 (a low-pass filter with bandwidth substantially equal to the bandwidth of filter 74). Output of program 407 is carried to program 427 via data line 424. In embodiments wherein the bandwidth of accelerometer 72 does not substantially exceed the bandwidth of filter 74, program 407 is not needed and the output of accelerometer 72 is carried directly to program 427 via data line 63. Program 427 output is carried via data line 418 to summer 422. Alternatively, acceleration may be calculated from rate-of-change-of-position information furnished by the robot controller (not shown). In cases where the only acceleration component substantially parallel to the CFD movement axis is a component of acceleration due to gravity, the magnitude of the component may be calculated by program 428 from orientation angle $\theta$ and weight data for the actuator-linkage-tool as described above, the angle and weights being stored in memory 77 and transmitted to program 428 via data lines 68. The output of program 428 is carried via data line 419 to summer 422. Potentiometer means 40 provides information to program 416 via data line 69, program 416 determining the appropriate sign of the friction component of estimated tool force by calculating the first derivative of the output of potentiometer means 40. The friction component of estimated tool force acts to oppose the motion of the actuator-linkage-tool-holder/tool. Sign information for the friction component is carried from program 416 to program 429 via data line 417. Program 429 comprises multiplying an estimated tool force friction component by the sign of the actuator-tool linkage movement, and the program 429 output is carried via data line 420 to summer 422. The linkage friction forces may be estimated by positioning the CFD so that the linkage will not be subjected to accelerations and measuring the forces required to move the actuator, linkage and tool-holder/tool assembly small distances in both directions about a substantially central position within its range of travel. The output of load cell means 30 is carried to low-pass filter 74 via data line 60, while the output of filter 74 is carried to summer 422 via data line 61.

In some preferred embodiments, the output of summer 422 is carried via data line 425 to low-pass filter 408, and the output of filter 408 is carried via data line 410 to summer 409, where it is summed with the reference tool force input from processor interface 75 via data line 67. In other preferred embodiments where the bandwidth of signals on line 425 is substantially equal to the bandwidth of filter 74 and thus, the signals require no limitation for adequate CFD performance, filter 408 is eliminated, and data line 425 carries the output of summer 422 directly to summer 409. When filter 408 is present, it has a half-power point between about 1 and 100 Hz, preferably about 10 Hz.

The output of summer 409 is carried to program 423 via data line 411, program 423 implementing a PID, PI, or PD controller. Program 423 output is carried via data line 65 to servo valve 79, which controls gas pressures in gas line 81. Gas line 81, in turn, communicates with first side 36 of actuator 32. The combination of gas pressures in first side 36 and second side 38 act on piston 34 to cause an actuator force to be transmitted to coupled portions of CFD 5 via piston rod 33.

Edge Finishing With Robotic CFD Positioning

Edge finishing operations when the CFD is under robotic control represent a class of applications in which the linkage from actuator through tool holder to tool is generally less compact than the linkage for surface finishing and therefore relatively more sensitive to inertial effects with components nonparallel to the movement axis. Tool forces are generally radial rather than axial in edge finishing (compared with primarily compression forces in surface finishing applications). These characteristics are reflected in the estimated tool force algorithm and the algorithm for calculation of second gas chamber pressures, both of which are programs executed by controller 46. Note again that actual tool force can not be measured directly, but must be estimated.

CFD Applications With Stationary Mounts

Finishing operations when the CFD is on a stationary mount represent a class of applications in which the linkage from actuator through tool holder to tool is not influenced by accelerations of the CFD itself, being subject only to a constant gravity vector having time-invariant orientation with respect to the CFD. Tool forces may be either radial or axial in stationary mount applications, but the necessary calculation of estimated tool force is not counfounded by effects of changing acceleration vectors as it may be in robotically positioned CFD applications. The algorithm for calculation of second gas chamber pressures is correspondingly simplified.

Processor Programs

The following listings comprise computer code for processor functions of embodiments of the present invention analogous to that shown in FIG. 1A. The "sum forces" code refers to estimated tool force calculations, and the "calculate error" and "controller calculation" code implements the functions of the first (primary) and second (secondary) side control loops.

```
/************************************************************************
Module : control.c
Purpose: control loop routine for constant force grinder.
Version: 0.1
Started: 23 September 1992
Last Modified: 26 January 1993

************************************************************************/ include "system.h"
include "control.h"

#define LOW_PASS_ORDER 5      /* Number of samples to average for
                              ** low pass filter
                              */ static int lowPassIndex;                       /* Index for lowPassArray */
static long lowPassArray[LOW_PASS_ORDER];      /* Keeps previous samples
                                               ** for low pass filter.
                                               */ void ControlLoopUpdate(void)
{
    int i;
    int cosTheta;
    long actualForce;
    long error;

/*********************** Sum forces ******************************/

/* Force due to motor weight */
    cosTheta = AnaReadCosTheta( );
    lowPassArray[lowPassIndex] = cosTheta *
                                        CfdUserConfiguration.toolWeight[tool];

/* Force due to acceleration */
    lowPassArray[lowPassIndex] += AnaReadAccelForce( );

/* Force read by load cell */
    lowPassArray[lowPassIndex] -= AnaReadLoadForce( );

/* Add or subtract frictional force based on direction of movement */
    if (AnaReadPosition( ) > 0)
         lowPassArray[lowPassIndex] += CfdConfiguration.frictionForce;
    else
         lowPassArray[lowPassIndex] -= CfdConfiguration.frictionForce;

/* Update array index to form circular buffer */
    lowPassIndex = (lowPassIndex+1) % LOW_PASS_ORDER;
```

```
/* Average to low pass filter actual force */
/* Sum last LOW_PASS_ORDER samples */
actualForce = 0L;
for (i=0;i<LOW_PASS_ORDER;i++)
    actualForce += lowPassArray[i];
/* Divide for average */
actualForce /= LOW_PASS_ORDER;

/*********************** Calculate Error ***********************/

/* Subtract desired force to get proportional error */
error = CfdUserConfiguration.commandForce - actualForce;

/* Calculate sum for integral error */
CfdState.priIntegralError += error;

/* Subtract for derivative error */
CfdState.priDerivativeError = error - CfdState.priError;

/********************** Controller Calculation **********************/

/* Primary controller calculation */
/* PID calculation: Kp*error + Ki*integral error + Kd*derivative */
CfdState.priEffort = CfdConfiguration.Kp * error +
            CfdConfiguration.Ki * CfdState.priIntegralError +
            CfdConfiguration.Kd * CfdState.priDerivativeError;

/* Secondary controller calculation */
CfdState.secEffort = (CfdConfiguration.stiffnessFactor *
                            CfdConfiguration.rodlessArea +
            cosTheta * CfdUserConfiguration.toolWeight[tool] -
            CfdUserConfiguration.commandForce) /
                            CfdConfiguration.rodArea;

/* Update analog outputs */
AnaUpdateServoValve(CfdState.priEffort);
AnaUpdateProportionalValve(CfdState.secEffort);
    return;
}
```

What is claimed is:

1. An apparatus to apply estimated tool force substantially equal to a reference tool force on a workpiece surface, comprising:

an actuator for exerting force on the tool;
a tool holder coupled to said actuator for holding the tool;
accelerometer means coupled to said actuator for measuring tool force acceleration effects;
load cell means coupled to said actuator and having a load cell means output for measuring force applied by said actuator;
a low-pass filter coupled to said load cell means for filtering said load cell output;
a processor coupled to said low-pass filter and said accelerometer means, said processor calculating the estimated tool force, including force applied by said actuator and said actuator acceleration effects;
a memory for storing processor programs and the reference tool force, said memory being coupled to said processor;
a processor interface for entering the reference tool force and processor programs into said processor, said processor interface being coupled to said processor; and
actuator force control means coupled to said actuator for rendering the estimated tool force substantially equal to the reference tool force on a workpiece surface under control of said processor.

2. The apparatus of claim 1 wherein the actuator comprises a double acting pneumatic cylinder.

3. The apparatus of claim 1 wherein the actuator comprises two single-acting pneumatic cylinders linked in an assembly to be capable of exerting force as a double acting pneumatic cylinder.

4. The apparatus of claim 1 wherein the tool holder comprises a motor.

5. The apparatus of claim 1 wherein accelerometer means comprises a three-axis set of accelerometers.

6. The apparatus of claim 1 wherein accelerometer means comprises an inclinometer.

7. The apparatus of claim 1 wherein the load cell means comprises a piezoelectric sensor.

8. The apparatus of claim 1 wherein the low pass filter has a half-power point is about 10 Hz.

9. The apparatus of claim 1 wherein actuator force control means comprises signal-controlled pressure regulators.

10. The apparatus of claim 1 wherein actuator force control means comprises servo valves.

11. The apparatus of claim 1 wherein the processor comprises a programmable digital computer.

12. The apparatus of claim 1 wherein the processor comprises an analog computer.

13. An apparatus positioned by a robot using robot position parameters proximate to a workpiece surface, the apparatus to apply estimated tool force substantially equal to a reference tool force on the workpiece surface, comprising:

an actuator for exerting force on the tool, said actuator having a range of motion;
a tool holder coupled to said actuator for holding the tool;
accelerometer means coupled to said actuator for measuring tool force acceleration effects;

potentiometer means coupled to said actuator and the tool holder, said potentiometer means for maintaining said actuator substantially centered within said range of motion;

load cell means coupled to said actuator and having a load cell means output for measuring force applied by said actuator;

a low-pass filter coupled to said load cell means for filtering said load cell output;

a processor coupled to said low-pass filter, said potentiometer means and said accelerometer means, said processor calculating the estimated tool force, including force applied by said actuator and said actuator acceleration effects;

a memory for storing processor programs for controlling operation of said processor, and the reference tool force, said memory being coupled to said processor;

a processor interface for entering the reference tool force and robot position parameters into said processor; and actuator force control means coupled to said actuator for rendering the estimated tool force substantially equal to the reference tool force on a workpiece surface under control of said processor.

14. The apparatus of claim 13 wherein the actuator comprises a double acting pneumatic cylinder.

15. The apparatus of claim 13 wherein the actuator comprises two single-acting pneumatic cylinders linked in an assembly to be capable of exerting force as a double acting pneumatic cylinder.

16. The apparatus of claim 13 wherein the tool holder comprises a motor.

17. The apparatus of claim 13 wherein accelerometer means comprises a three-axis set of accelerometers.

18. The apparatus of claim 13 wherein accelerometer means comprises an inclinometer.

19. The apparatus of claim 13 wherein accelerometer means comprises acceleration calculated from robot position parameters.

20. The apparatus of claim 13 wherein potentiometer means comprises a linear variable differential transformer.

21. The apparatus of claim 13 wherein the load cell means comprises a piezoelectric sensor.

22. The apparatus of claim 13 wherein the low pass filter has a half-power point at about 10 Hz.

23. The apparatus of claim 13 wherein actuator force control means comprises pressure regulators.

24. The apparatus of claim 13 wherein actuator force control means comprises servo valves.

25. An apparatus positioned by a robot using robot position parameters proximate to a workpiece surface, the apparatus to apply estimated tool force substantially equal to a reference tool force on the workpiece surface, comprising:

a double-acting pneumatic actuator for exerting force on the tool, said actuator having a first gas chamber and a second gas chamber, a movement axis, and a range of motion;

a tool holder coupled to said actuator for holding the tool, said tool holder being capable of movement substantially parallel to said movement axis;

accelerometer means coupled to said actuator for measuring a tool force acceleration component;

potentiometer means coupled to said actuator and the tool, said potentiometer means for locating said actuator within said range of motion;

load cell means coupled to said actuator and having a load cell means output for measuring force applied by said actuator;

a low-pass filter coupled to said load cell means for filtering said load cell output;

a processor coupled to said low-pass filter, said potentiometer means and said accelerometer means, said processor calculating the estimated tool force, including force applied by said actuator and said actuator acceleration effects;

a memory for storing processor programs for controlling operation of said processor, and the reference tool force, said memory being coupled to said processor;

a processor interface for entering the reference tool force and robot position parameters into said processor; and actuator force control means coupled to said first and second gas chambers for rendering the estimated tool force substantially equal to the reference tool force on a workpiece surface under control of said processor.

26. The apparatus of claim 25 wherein the tool holder comprises a motor.

27. The apparatus of claim 25 wherein accelerometer means comprises a three-axis set of accelerometers.

28. The apparatus of claim 25 wherein accelerometer means comprises an inclinometer.

29. The apparatus of claim 25 wherein accelerometer means comprises acceleration calculated from robot position parameters.

30. The apparatus of claim 25 wherein potentiometer means comprises a linear variable differential transformer.

31. The apparatus of claim 25 wherein the load cell means comprises a piezoelectric sensor.

32. The apparatus of claim 25 wherein the low pass filter characteristic half-power point is about 10 Hz.

33. The apparatus of claim 25 wherein processor programs further comprise programs to control gas flow to said second gas chamber.

34. The apparatus of claim 25 wherein processor programs further comprise proportional-integral-derivative control programs.

35. The apparatus of claim 25 wherein the second side control loop program is a function of the reference tool force and said tool force acceleration component.

36. The apparatus of claim 25 wherein actuator force control means comprises pressure regulators.

37. The apparatus of claim 25 wherein actuator force control means comprises servo valves.

38. A method of applying an estimated tool force substantially equal to a reference tool force at a workpiece surface, comprising:

providing an actuator for applying an actuator component of tool force through a mechanical linkage, said actuator having a first side input and an opposite-acting second side input;

estimating a tool force acceleration component due to acceleration of said actuator;

estimating a tool force friction component due to friction in said mechanical linkage;

measuring actuator force applied by said actuator;

low-pass filtering said actuator force;

estimating actual tool force based on said tool force acceleration component, said tool force friction component, and said filtered actuator force;

comparing said estimated actual tool force with the reference tool force to obtain an error signal;

producing said first side actuator input by processing said error signal through a proportional-integral-derivative controller;

producing said second side actuator input by combining the the reference tool force and the tool force acceleration component; and applying said first and second side actuator inputs to said actuator to obtain said estimated actual tool force substantially equal to the reference tool force.

39. The method of claim 38 wherein said actuator is a double-acting pneumatic cylinder.

40. The method of claim 38 wherein said actuator is hydraulic.

41. The method of claim 38 wherein said actuator is electromagnetic.

42. The method of claim 38 wherein said tool force acceleration component is estimated by calculation of rate-of-change of position of said actuator.

43. The method of claim 38 wherein said tool force acceleration component is estimated by calculation based on inclinometer output, said inclinometer being coupled to said actuator.

44. The method of claim 38 wherein said tool force acceleration component is estimated by calculation based on three-axis accelerometer output, said accelerometer being coupled to said actuator.

45. The method of claim 38 wherein said tool force acceleration component is estimated by calculation based on single-axis accelerometer output, said accelerometer being coupled to said actuator.

46. The method of claim 38 wherein said low pass filtering is with a filter having a half-power point between about 1 and 100 Hz.

47. The method of claim 38 wherein said low pass filtering is with a filter having a half-power point about 10 Hz.

48. A method of using an actuator controlled by first side and second side signals, the actuator acting through a linkage to a tool to apply an estimated actual tool force substantially equal to a reference tool force at a workpiece surface, comprising:

estimating a tool force acceleration component due to acceleration of said actuator;

estimating a tool force friction component due to friction in the linkage from actuator to tool;

measuring actuator force applied by said actuator;

low-pass filtering said actuator force with a filter having a half-power point between about 1 and 100 Hz;

estimating actual tool force based on said tool force acceleration component, said tool force friction component, and said filtered actuator force;

comparing said estimated actual tool force with the reference tool force to obtain an error signal;

processing said error signal through a proportional-integral-derivative controller to form the first side signal;

calculating the second side signal using a second side equation which includes the reference tool force and said tool force acceleration component as terms; and combining the first side and second side signals to control the actuator to apply through the linkage an estimated actual tool force substantially equal to the reference tool force.

49. The method of claim 48 wherein said tool friction component includes friction in the actuator.

50. The method of claim 48 wherein said low-pass filtering is with a filter having a half-power point about 10 Hz.

51. The method of claim 48 wherein said tool force acceleration component is estimated by calculation of rate-of-change of position of the actuator.

52. The method of claim 48 wherein said tool force acceleration component is estimated by an inclinometer coupled to the actuator.

53. The method of claim 48 wherein said tool force acceleration component is estimated by calculation based on three-axis accelerometer output, said accelerometer being coupled to the actuator.

54. The method of claim 48 wherein said tool force acceleration component is estimated by calculation based on single-axis accelerometer output, said accelerometer being coupled to the actuator.

55. The method of claim 48 wherein said second side equation is linear.

56. The method of claim 48 wherein said second side equation contains nonlinear terms.

* * * * *